US006556729B2

United States Patent
Satorius

(10) Patent No.: US 6,556,729 B2
(45) Date of Patent: Apr. 29, 2003

(54) ACOUSTO-OPTIC BANDPASS FILTER

(75) Inventor: Duane Anthony Satorius, Fulton, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 35 days.

(21) Appl. No.: 09/682,150

(22) Filed: Jul. 27, 2001

(65) Prior Publication Data

US 2003/0021510 A1 Jan. 30, 2003

(51) Int. Cl.⁷ .............................................. G02F 1/335
(52) U.S. Cl. ................................ 385/7; 385/28; 385/37
(58) Field of Search ........................... 385/7, 28, 8, 10, 385/37, 42, 4

(56) References Cited

U.S. PATENT DOCUMENTS

| | | | | |
|---|---|---|---|---|
| 5,400,171 A | * | 3/1995 | Song ........................... | 359/285 |
| 6,004,703 A | * | 12/1999 | Jang et al. ...................... | 430/5 |
| 6,021,237 A | * | 2/2000 | Kim et al. ...................... | 385/28 |
| 6,430,342 B1 | * | 8/2002 | Kim et al. ...................... | 385/37 |
| 2001/0024545 A1 | * | 9/2001 | Sorin et al. ................... | 385/28 |

OTHER PUBLICATIONS

Ramachandra, et al., "All–Fiber, Grating, Higher–order mode Dispersion Compensator for Broadband Compensation and 1000–km Transmission at 40–GBs", European Conf. Opt. Comm., 2000, 2 pg.

Ramachandra, et al., "Large bandwidth, highly efficient mode coupling using long period gratings in dispersion tailored fibers", MC2–1, 3 pgs.

Dimmick, et al., "Narrow–band acousto–optic tunable filter fabricated from highly uniform tapered optical fiber", FB4, 3 pgs.

Grubsky, et al., "Long–period fiber gratings with variable coupling for real–time sensing applications", Optic Letters, vol. 25, No. 4, Feb. 15, 2000, pp 203–205.

* cited by examiner

Primary Examiner—Robert H. Kim
Assistant Examiner—Michael H Caley
(74) Attorney, Agent, or Firm—Stephen M. Bloor

(57) ABSTRACT

The acousto-optic bandpass filter is a device whereby one or more bands of optical wavelengths may be selected for further transmission. In this device, all light within the optical bandwidth of operation is first coupled from the core mode of a optical fiber to a specific cladding mode by a long-period photo-induced grating. These cladding mode lightwaves then enter an acousto-optic interaction region where selected RF frequencies of flexure waves, induced by an acoustic wave amplifier, re-couple selected bands of wavelengths back into the core mode. The interaction region is isolated from the broadband coupler by an acoustic absorber to limit acoustic interaction to the interaction region.

12 Claims, 6 Drawing Sheets

ACOUSTO-OPTIC BANDPASS FILTER

BACKGROUND OF INVENTION

1. Field of the Invention

This invention relates generally to telecommunication systems and assemblies, and more particularly to an acousto-optic bandpass filter.

2. Description of the Related Art

An important function in the telecommunication industry is signal switching. The switching can be performed either electronically or optically. In past years, the switching was accomplished through electronic means. However, with the increasing demand for lower cost, higher switching speeds, lower power consumption, and lower optical losses, optical switching is becoming more commonplace. There are two types of optical switches currently used; wavelength insensitive optical switches, and wavelength sensitive optical switches. The wavelength insensitive optical switches are typically broadband fiber-to-fiber switches used to redirect all the traffic from one optical fiber to another. Because the switching process is either thermo, electro-optic, or mechanical, the switching speed is satisfactory. However these switches do not satisfy the requirement of low cost, reliability, and low optical insertion loss.

The wavelength sensitive optical switches are needed for wavelength division multiplexed (WDM) signals because the wavelength separation between channels is small. A narrow optical band of traffic carried by a specific wavelength of a multi-wavelength signal may need to be separated from the rest of the traffic. A wavelength-sensitive optical switch can perform this function optically at considerable cost savings. Existing wavelength sensitive optical switches are usually bulky, have high power consumption, and high optical insertion losses. For instance, in a previous patent Tunable Optic Fiber Bandpass Filter Using Flexural Acoustic Waves, U.S. Pat. No. 6,151,427, by this inventor, I discuss an acousto-optic bandpass filter, however that invention uses a core block that introduces significant optical insertion losses, added complexity, and is costly to manufacture. The present invention does not require a core block component, thereby negating these problems and simplifying the architecture. Other acousto-optic filters include "Acousto-optic Filter," U.S. Pat. No. 6,233,379 by Kim et al. hereby incorporated by reference. This invention performs the function of a band-stop filter and can select a limited number of optical bands (channels) simultaneously but does so at the cost of increased power consumption for each band selected to the limit of the acousto-optic generator. The current invention eliminates all the optical bands (channels) simultaneously without using any power and can select one or more channels to pass through the filter, thus performing a bandpass operation.

SUMMARY OF INVENTION

In consideration of the problems detailed above and the discrepancies enumerated in the partial solutions thereto, an object of the present invention is to provide an improved acousto-optic bandpass filter that does not require a core-block and uses less electrical power.

Another object of the present invention is to provide a tunable acousto-optic filter.

Still another object of the present invention is to provide an acousto-optic bandpass filter with multiple acoustic signals that have individual controllable strengths and frequencies.

Yet another object of the present invention is to provide a broadband cladding mode coupler to efficiently couple all the optical traffic from the core mode to a cladding mode for later selection of individual optical channels.

Yet a further object of the present invention is to provide an acousto-optic bandpass filter that includes an optical fiber with a core and a cladding where the strength or the magnitude of an optical signal coupled from the cladding to the core is changed by varying the amplitude of radio frequency (RF) signal(s) applied to the acoustic wave generator.

In order to attain the objectives described above, according to an aspect of the present invention, there is provided an Acousto-Optic Bandpass Filter that includes a standard single-mode optical fiber with a core and a cladding surrounding the core in a concentric fashion. The optical fiber can support multiple cladding modes and a single core mode that is guided along the core. An acoustic wave amplifier has a base and a tip that is coupled to the fiber. The acoustic wave amplifier propagates an acoustic wave from the base to the tip and launches a flexural wave into the optical fiber. At least one acoustic wave generator is coupled to the base of the acoustic wave amplifier.

The acousto-optic bandpass filter is a device whereby one or more bands of optical wavelengths may be selected for further transmission. In this device, all light within the optical bandwidth of operation is first coupled from the core mode of a optical fiber to a specific cladding mode by a long period, typically photo or UV induced grating. These cladding mode lightwaves then enter an acousto-optic interaction region where selected RF frequencies of flexure waves, induced by acoustic wave generator, re-couple selected bands of wavelengths back into the core mode. The interaction region is isolated from the broadband coupler by an acoustic absorber to limit acoustic interaction to the interaction region.

In another embodiment of the present invention, an acoustic absorber is positioned between the broadband cladding mode coupler and the acoustic wave amplifier to prevent the acoustic waves from interfering with the broadband cladding mode coupler.

The aforementioned features, objects, and advantages of this method over the prior art will become apparent to those skilled in the art from the following detailed description and accompanying drawings.

BRIEF DESCRIPTION OF DRAWINGS

My invention can best be understood when reading the following specification with reference to the accompanying drawings, which are incorporated in and form a part of the specification, illustrate alternate methods of the present invention, and together with the description, serve to explain the principles of the invention. In the drawings.

DETAILED DESCRIPTION

Figure 1:
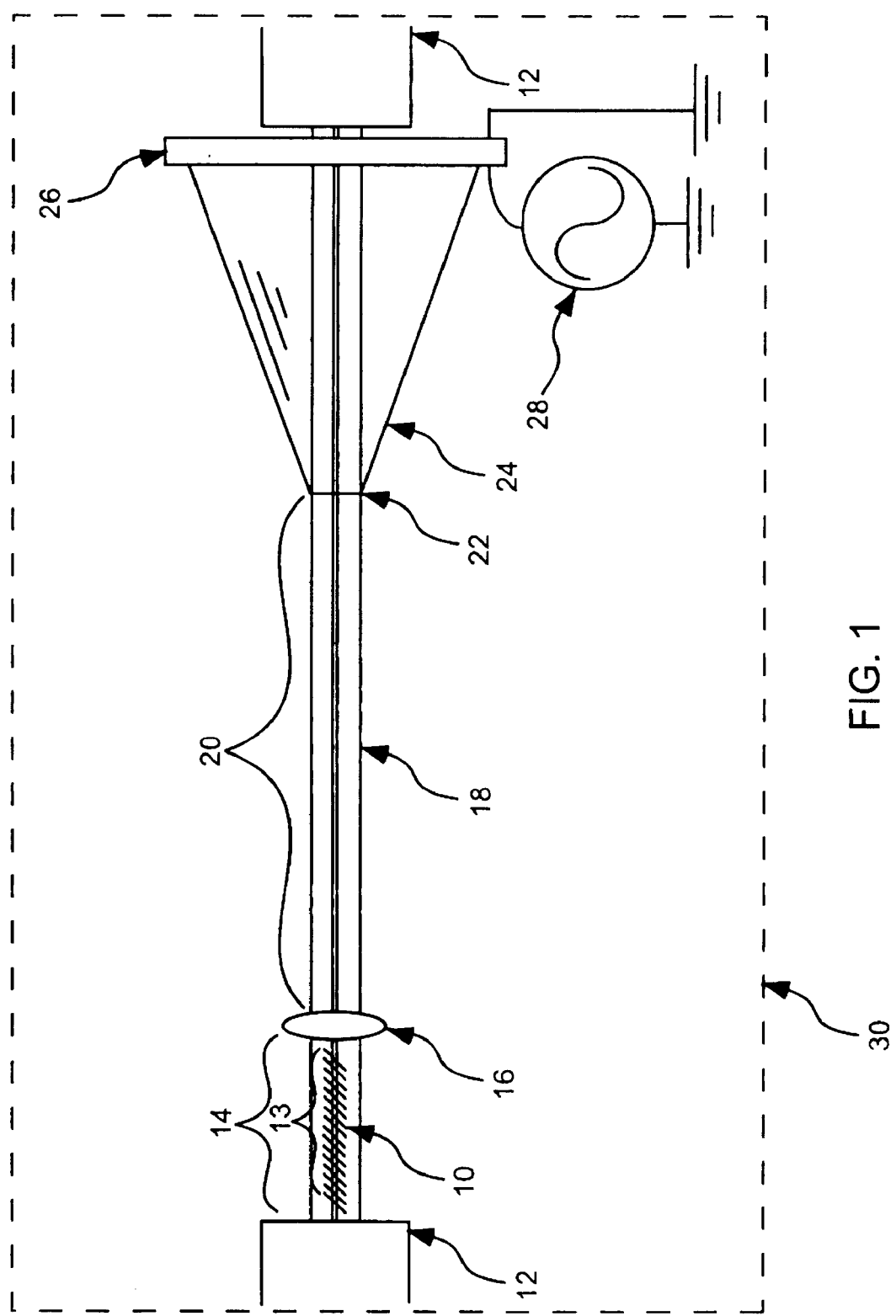
FIG. 1 is a schematic diagram of one embodiment of the acousto-optic bandpass filter that shows the broadband cladding mode coupler, the acoustic absorber, the acoustic wave amplifier, and the acoustic wave generator.

In a preferred embodiment of the present invention, an acousto-optic bandpass filter 30, as shown in FIG. 1, one or more bands of optical wavelengths may be selected for further transmission. In this device, all lightwaves within the optical bandwidth of operation are first coupled from the core mode of a non-birefringent single-mode fiber 18 to a specific cladding mode by a, typically photo-induced, long-period grating 10 within a broadband cladding mode coupler 14. These cladding mode lightwaves then enter an acousto-optic interaction region 20 where selected frequencies of flexure waves, induced by acoustic wave amplifiers 24, re-couple selected narrow bands of wavelengths back into the core mode of the non-birefringent single-mode fiber 18. The acousto-optic interaction region 20 is isolated from the broadband cladding mode coupler 14 by an acoustic absorber 16 to limit the acoustic interaction.

Figure 2:
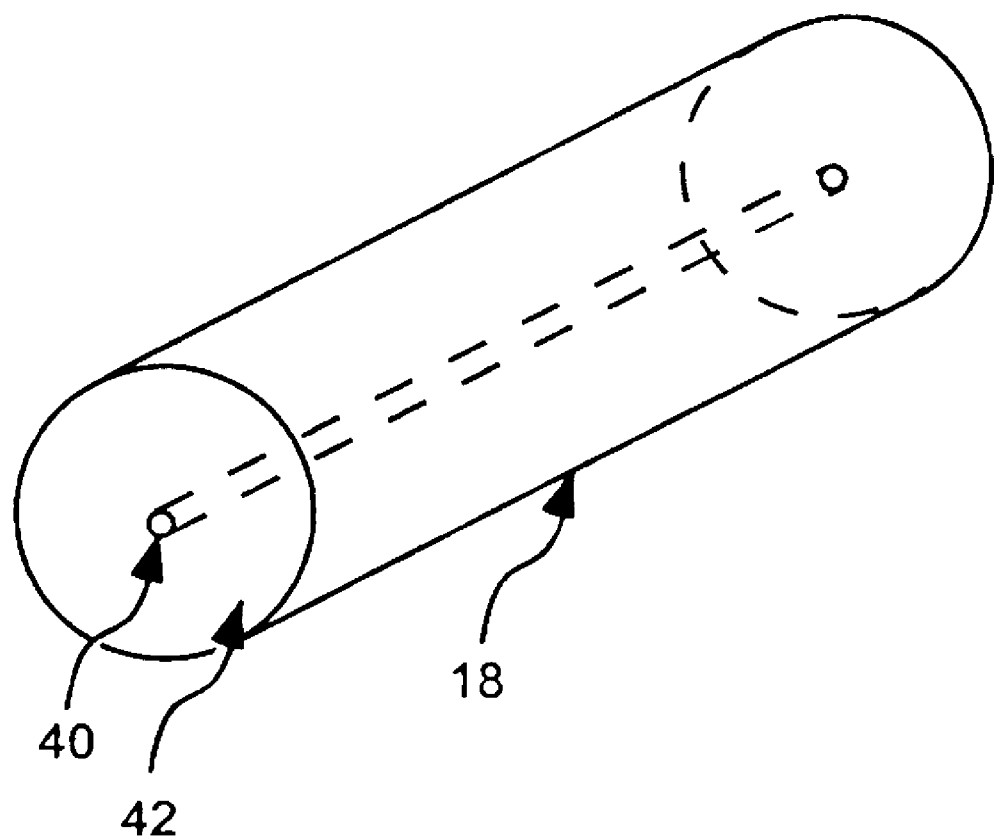
FIG. 2 is a cross-sectional view of the optical fiber.

A non-birefringent single-mode fiber 18 (herein single-mode fiber) has a core 40 and a cladding 42 surrounding the core in a concentric fashion as illustrated in FIG. 2. The single-mode fiber 18 can support the propagation of multiple cladding modes and a single core mode over a nominal wavelength range. In a preferred embodiment of the present invention, the single-mode fiber 18 is tensioned sufficiently to keep the fiber straight. The single-mode fiber 18 should remain straight in this application to reduce optical losses of the cladding mode lightwaves.

The core 40 of the single-mode fiber 18 is substantially circularly-symmetric to ensure the refractive index of the core 40 is essentially insensitive to the state of optical polarization. In a typical non-birefringent single-mode fiber (as in 18 herein), the effective difference in index of refraction between polarization states is typically smaller than $10^{-5}$.

The broadband cladding mode coupler 14 is composed of a long-period grating 10, typically photo-induced, within a single-mode fiber 18 that has been suitably tailored to alter the dispersion properties. This section of the single-mode fiber 18 that has been tailored to alter the dispersion properties is shown as the tailored section 13 in FIG. 1. The alteration of the single-mode fiber 18 may include but not limited to changing the index of refraction of the core 40, the index of refraction of the cladding 42, or the fiber geometry.

The function of the broadband cladding mode coupler 14 is to significantly couple the core-mode lightwaves of the single-mode fiber 18 entering the acousto-optic bandpass filter 30 into cladding mode lightwaves. Although the cladding 42 of the single-mode fiber 18 may support multiple modes, the lightwaves are coupled to a specific cladding mode, preferably of a lower order (i.e. LP(1,1), (1,2), or (1,3)).

The theory of broadband photo-induced gratings and some experimental results are discussed in a paper entitled *Long-Period Fiber Gratings with Variable Coupling for Real-Time Sensing Applications* by Grubsky et al. which is hereby incorporated by reference. Two additional papers entitled *Large Bandwidth, Highly Efficient Mode Coupling Using Long Period Gratings in Dispersion Tailored Fibers* and *All-Fiber, Grating-Based, Higher-Order Mode Dispersion Compensator for Broadband Compensation and 1000-Km Transmission at 40 Gb/s* by Ramachandran et al. also discuss the theory. The long-period grating 10 is located within the tailored section 13. The tailored section 13 is either fused into the standard single-mode fiber 18, or the standard single-mode fiber 18 is suitably tailored throughout at least the extent of the long-period grating.

The entire broadband signal, having been coupled into a cladding mode in the broadband cladding mode coupler 14, now propagates parallel to the optical axis of the single-mode fiber 18 through the cladding 42 into an acousto-optic interaction region 20 where selected bands of lightwaves are coupled from the cladding 42 back into the core 40. A typical bandwidth of the selected bands of lightwaves being coupled back into the core 40 is 1–2 nm. This coupling is tuned by varying the RF frequency of a signal applied to the acoustic wave generator 26, which in turn couples acoustic energy through the acoustic wave amplifier 24 to the single-mode fiber 18 in the acousto-optic interaction region 20.

To limit the acousto-optic interaction to the acousto-optic interaction region 20 and to prevent disruption of the broadband coupler 14, an acoustic absorber 16 coupled to the single-mode fiber 18 is interposed between the acoustic wave amplifier 24 and the broadband cladding mode coupler 14. The acoustic absorber 16 is coupled to and surrounds the single-mode fiber 18. The acoustic absorber 16 significantly dampens any acoustic waves and minimizes reflections of acoustic waves. Any reflections of the acoustic wave will cause an intensity modulation of the optical signal passing through the bandpass filter 30 by generating frequencies sidebands in the optical signal. The acoustic absorber 16 can be made of a variety of materials. In one embodiment, the acoustic absorber 16 is made of a soft material that has a lower acoustic impedance and an index of refraction lower than the cladding 42 of the single-mode fiber 18. The lower index of refraction is necessary to prevent the cladding lightwaves entering the absorber 16 from being scattered. The lower index of refraction will permit the lightwaves to pass through the absorber 16 without being disturbed.

Figure 3:
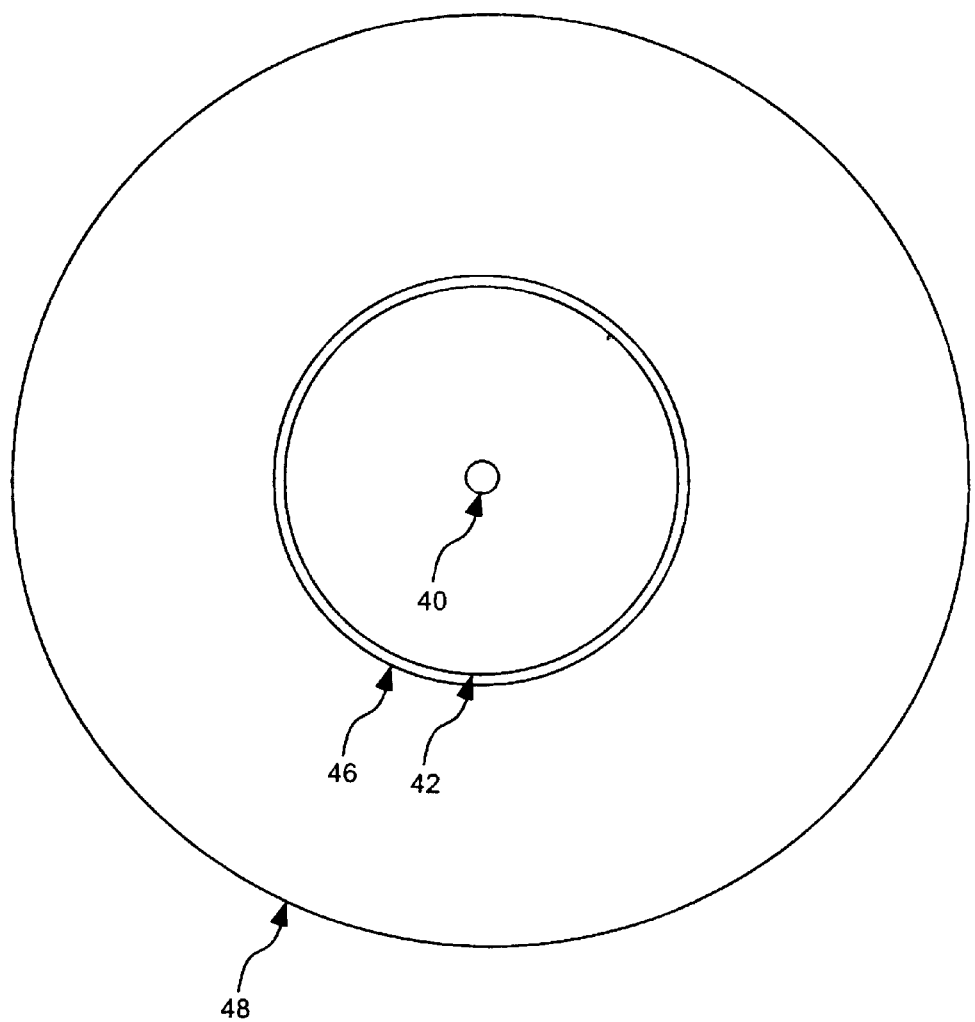
FIG. 3 is an illustration of the acoustic wave amplifier.

An alternative embodiment of an acoustic absorber consists of a thin layer 46 of a low index of refraction material coupled to the fiber 18 with a high index acoustic absorber 48 coupled to the thin layer 46 as shown in FIG. 3.

In the preferred embodiment, the acousto-optic interaction region 20 extends from the tip 22 of the acoustic wave amplifier 24 to the acoustic absorber 16. The length of the single-mode fiber 18 in the interaction region 20 is typically less than 1 meter, and preferably less than 20 cm. The uniformity of the fiber diameter and index of refraction is important within the acousto-optic interaction region 20 to maximize coupling efficiency and minimize spectral sidebands in the transmission spectrum of the filter. Other issues regarding the length of this interaction region are discussed in U.S. Pat. No. 6,233,379 by Kim previously incorporated as a reference.

Figure 4:
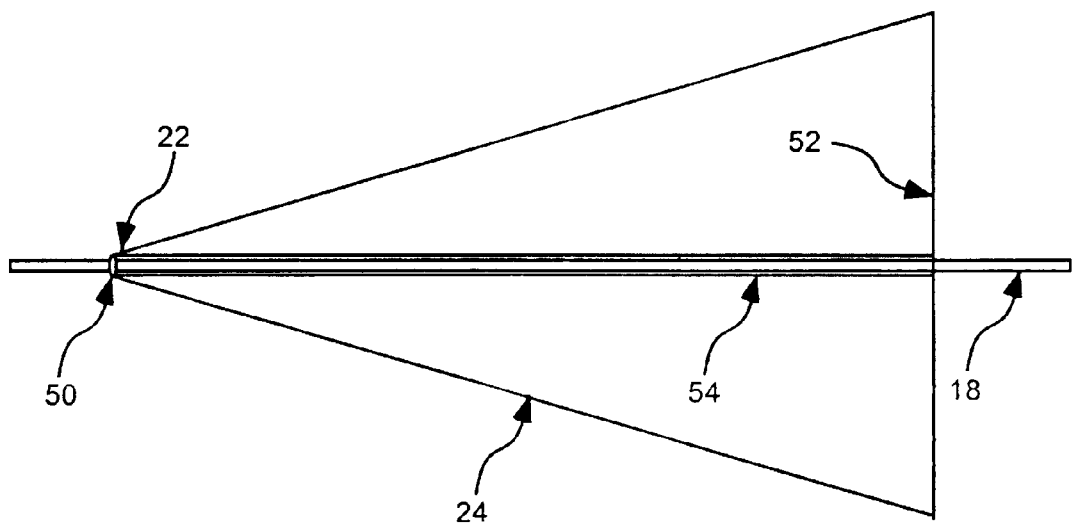
FIG. 4 is a cross-sectional view of the acoustic absorber with a thin layer of low index of material surrounding the fiber.

As shown in FIG. 4 the coupling in the acousto-optic interaction region 20 is accomplished by generating a sinusoidal RF frequency using the frequency source 28 that is electrically attached to the acoustic wave generator 26. The sinusoidal electrical signal causes a mechanical vibration of the acoustic wave generator 26 that launches acoustic waves from the base 52 to the tip 22 of the acoustic wave amplifier 24 and the acoustic waves are then coupled to the single-mode fiber 18, typically through a bonding agent 50. The acoustic wave amplifier 24 is coupled to the single-mode fiber 18 at the tip 22. The flexural wave creates a traveling periodic microbend structure in the single-mode fiber 18. The periodic microbend induces an antisymmetric refractive index change in the single-mode fiber 18, and thereby, couples light from a cladding mode to a core mode. For efficient mode coupling, the period of the microbending, or the acoustic wavelength, should match the beat length between the coupled modes. The beat length is defined by the optical wavelength divided by the effective refractive index difference between the two modes.

The acoustic wave amplifier 24 can have a variety of different geometric configurations but is preferably elongated. In various embodiments, the acoustic wave amplifier 24 is tapered from the base 52 to the tip 22 and can be conical as illustrated in FIG. 4. The conical shape of the acoustic wave amplifier 24 provides magnification of the acoustic amplitude at the tip 22. Generally, the acoustic wave amplifier 24 has a longitudinal axis that is parallel to the single-mode fiber 18, however the acoustic amplifier 24 may be coupled to the single-mode fiber 18 at any angle or even from the side such that the axis of the acoustic wave amplifier 24 is nearly orthogonal to the axis of the single-mode fiber 18. The acoustic wave amplifier 24 can be made from a glass capillary, such as fused silica, a cylindrical rod with a central hole, or the like. In another embodiment a glass capillary is machined to form a cone and the flat bottom of the cone is bonded to an acoustic wave generator 26. To preserve the phase of the acoustic energy the exterior surface of the acoustic wave amplifier 24 is generally smooth. In other embodiments, the acoustic wave amplifier 24 is a horn with a diameter that decreases exponentially from the base 52 to the tip 22.

One embodiment of acoustic wave amplifier 24 has an interior with an single-mode fiber 18 receiving channel 54. The receiving channel 54 can be a capillary channel with an outer diameter slightly greater than the outer diameter of the single-mode fiber 18 used. The length of the capillary receiving channel 54 is preferably in the range of 5–15 millimeters. The interior of the acoustic wave amplifier 24 can be solid.

The single-mode fiber 18 is coupled to the acoustic wave amplifier 24. The dimensions of receiving channel 54 and an outer diameter of the single-mode fiber 18 are sufficiently matched to place the two in a contacting relationship at their interface. In this embodiment, the relative sizes of single-mode fiber 18 and receiving channel 54 need only be substantially the same at the interface. Further, in this embodiment, the difference in the diameter of single-mode fiber 18 and receiving channel 54 are in the range of 1–10 $\mu$m.

In typical embodiments a bonding agent 50 is positioned between the single-mode fiber 18 and the receiving channel 54 at the interface. Suitable bonding agents 50 include but are not limited to bonding materials, epoxy, glass solder, metal solder and the like. The bonding agent 50 is sufficiently rigid for efficient transduction of the acoustic wave from the acoustic wave amplifier 24 to the single-mode fiber 18 and the bonding agent 50 is sufficiently rigid to minimize back reflections of the acoustic waves from the single-mode fiber 18 to the acoustic wave amplifier 24.

At least one acoustic wave generator 26 is coupled to the base 52 of the acoustic wave amplifier 24 which mechanically resonates at a frequency in the range of 1–40 MHz. The acoustic wave generator 26 is preferably a shear mode transducer. The acoustic wave generator 26 can be made at least partially of a piezoelectric material whose physical shape is changed in response to an applied electric voltage induced by an RF frequency generator 28. Suitable piezoelectric materials include but are not limited to quartz, lithium niobate, zinc monoxide, and PZT, a composite of lead, zinconate, and titanate.

The acoustic wave generator 26 may produces multiple acoustic signals with individual controllable amplitudes and frequencies. Each of the acoustic signals may provide a coupling between the cladding mode and the core mode. Selected bands of lightwaves of the optical signal may be converted from the cladding mode to the core mode by choosing the frequencies of the signal applied to the acoustic wave generator 26.

Referring again to FIG. 1, the broadband cladding mode coupler 14 converts the lower-order core mode entering the acousto-optic bandpass filter 30 into a higher-order cladding mode. If an electric signal with sinusoidal frequency $f_1$ is applied to the acoustic wave generator 26, a flexural acoustic wave having the same frequency $f_1$ is generated on the single-mode fiber 18 within the acousto-optic interaction region 20. The flexural acoustic wave is transferred to the single-mode fiber 18 at the tip 22 of the acoustic wave amplifier 24 and travels along the single-mode fiber 18 within the acousto-optic interaction region 20, and is finally absorbed in the acoustic absorber 16. As the flexural acoustic wave travels along the acousto-optic interaction region 20, it produces periodic microbending along the single-mode fiber 18, resulting in the periodic change of the effective refractive index within the acousto-optic interaction region 20. As the lightwaves propagate along the single-mode fiber 18 in the cladding mode, a desired band of lightwaves may be converted back to the core mode provided the phase-matching condition is satisfied according to: $L_b = \Lambda_a = 2\pi/(\beta_{co}(\lambda) - \beta_{cl}(\lambda))$, where $\Lambda_a$ represents the acoustic wavelength of the flexural acoustic waves, $L_b$ represents the beat length, and $\beta_{co}(\lambda)$ and $\beta_{cl}(\lambda)$ are optical wavelength dependent propagation constants of the single-mode fiber 18 core mode and the cladding mode, respectively. When the acoustic wavelength $\Lambda_a$ is equal to the beat length $L_b$ between the two modes, the phase-matching condition is satisfied and conversion between modes occurs. The remaining cladding mode lightwaves that are not converted to the core mode get absorbed in the buffer 12 of the fiber upon exiting the acousto-optic bandpass filter 30 or may be absorbed by bonding agent 50. The desired band of optical lightwaves may be tuned by adjusting the RF frequency and the rejection efficiency may be tuned by adjusting the amplitude of the RF frequency applied to the acoustic wave generator 26.

Accordingly, if the frequency of the RF signal applied to the acoustic wave generator 26 varies, the acoustic wavelength generated within the single-mode fiber 18 also varies, which results in the passage of a different band of lightwaves by the acousto-optic bandpass filter 30. In addition, since the magnitude of the optical signal that is passed is dependent of the amplitude of the flexural acoustic wave, the optical signal strength can be adjusted by varying the amplitude of the RF signal that is applied to the acoustic wave generator 26.

Figure 5:
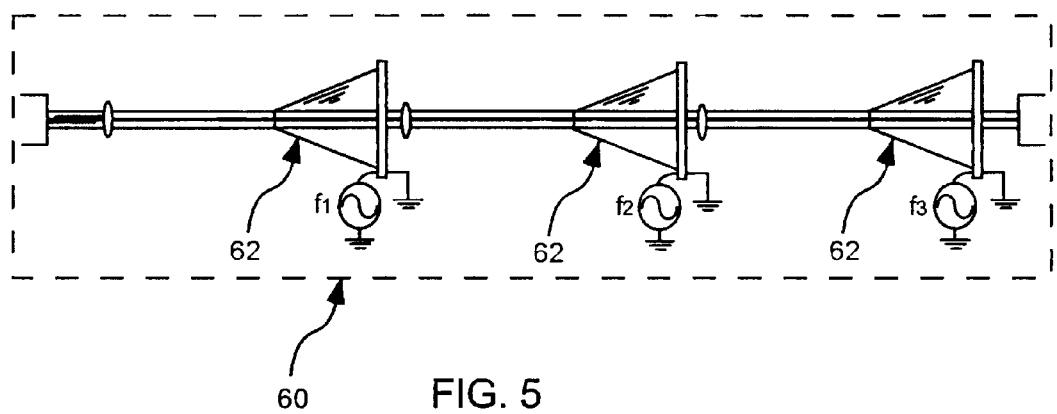
FIG. 5 is an illustration of a bandpass filter using multiple acoustic wave amplifiers.

Multiple bands of lightwaves can be simultaneously passed by the acousto-optic bandpass filter 30 as illustrated in another embodiment in FIG. 5. This optical architecture uses multiple acoustic wave amplifiers 62 to permit multiple bands of lightwaves to be converted from the cladding mode to the core mode. Although multiple RF frequencies may be applied to a single acoustic wave generator 26, the difference between the RF frequencies may not be less than 50 KHz. RF frequencies applied to the same acoustic wave generator 26 and separated by less than 50 KHz cause amplitude modulation of the optical lightwaves passing through the acousto-optic bandpass filter 30. To prevent this amplitude modulation, different acoustic wave generators 62 are used in those cases where it is desired to bandpass neighboring bands of lightwaves. A more detailed explanation of the amplitude modulation phenomena caused by multiple RF frequencies is given in U.S. Pat. No. 6,233,379 by Kim. In addition, the bonding agent used to couple the acoustic wave amplifiers 62 to the single-mode fiber 18, must have a lower index of refraction than the cladding of the single-mode fiber 18. If the bonding agent 50 were of equal or of higher index, the cladding lightwaves would be absorbed by the bonding agent 50.

Figure 6:
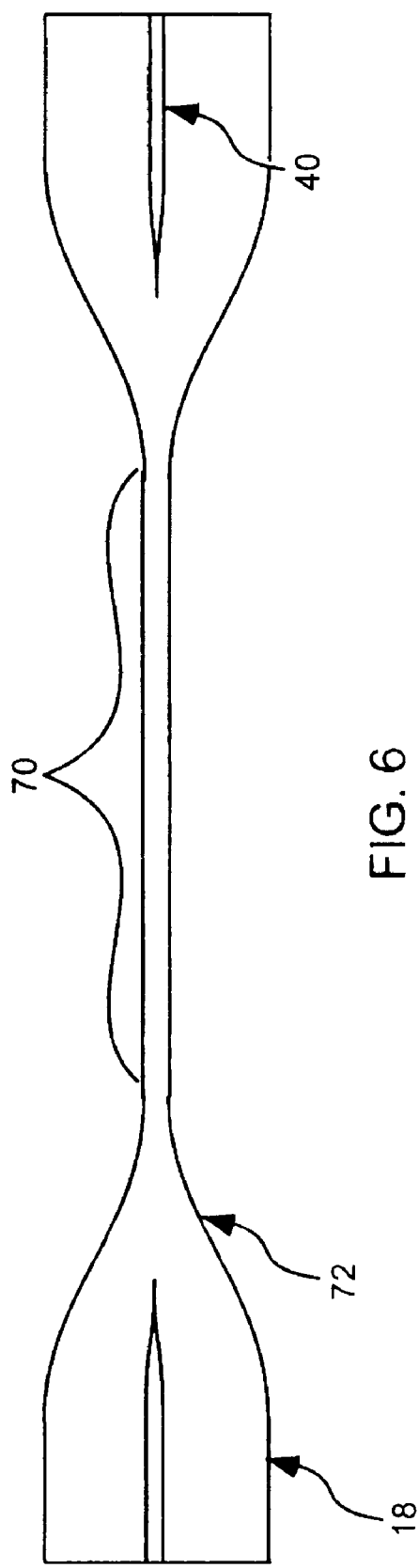
FIG. 6 is a diagram of a fiber having a tapered region.
}

Another embodiment of the present invention uses a single-mode fiber 18 that is tapered within the acousto-optic interaction region 20. A diagram of this embodiment is illustrated in FIG. 6. As shown, a uniform section 70 of narrower diameter single-mode fiber 18 is created and can be prepared by a variety of methods including but not limited to use of a traveling torch. Propagation constants of optical modes and the acoustic velocity can be greatly changed by the diameter change of the single-mode fiber 18. The pulling process causes a smooth transition 72 that changes the diameter of core 40 and cladding 42 and also changes the relative core index of refraction due to dopant diffusion. Additionally, the internal stress distribution is modified by stress annealing. The resultant effect of a tapered interaction region 70 to the acousto-optic bandpass filter 30 is an improved conversion efficiency of the lightwaves from the cladding mode to the core mode. In addition, the interaction region 70 will be significantly reduced in length, however higher RF frequencies will be required to generate shorter acoustic wavelengths, $\Lambda_a$, due to the smaller diameter of the single-mode fiber 18 thereby satisfying the phase matching condition. A more detailed discussion of the theory and experimental results are included in a paper entitled *Narrow-Band Acousto-Optic Tunable Filter Fabricated From A Highly Uniform Tapered Optical Fiber* by Dimmick, et al. and is hereby included by reference.

Although various preferred embodiments and methods of the present invention have been described herein in detail to provide for complete and clear disclosure, it will be appreciated by those skilled in the art, that variations may be made thereto without departing from the spirit of the invention or the scope of the appended claims.

What is claimed is:

1. An acousto-optic bandpass filter, comprising:
   a non-birefringent single-mode optical fiber, with a longitudinal axis, core, concentric cladding over the core, and proximal and distal ends;
   a broadband cladding mode coupler further comprising a longitudinal length of said optical fiber closer to the proximal end tailored to alter the dispersion properties, a quadratic-dispersion long period grating induced into said optical fiber within said longitudinal length;
   an acousto-optic interaction region further comprising a longitudinal length of said optical fiber closer to the distal end having at least one acoustic wave generator coupled to said optical fiber.

2. The filter of claim 1, further comprising an acoustic absorber coupled to said optical fiber between said broadband cladding mode coupler and said acousto-optic interaction region.

3. The filter of claim 2, wherein said acoustic absorber has a lower index of refraction than the cladding of said optical fiber.

4. The filter of claim 2, wherein said acoustic absorber is further comprised of a thin layer of a low index of refraction material coupled to said optical fiber.

5. The filter of claim 2, wherein said acoustic absorber is further comprised of a thin layer of a low index of refraction material coupled to said optical fiber.

6. The filter of claim 1, wherein said optical fiber is tensioned along its longitudinal axis.

7. The filter of claim 1, where said quadratic-dispersion long period grating is photo-induced.

8. The filter of claim 1, wherein said longitudinal length of said optical fiber closer to the proximal end tailored to alter the dispersion properties is tailored by altering the index of refraction of the core of said optical fiber.

9. The filter of claim 1, wherein said longitudinal length of said optical fiber in said acousto-optic interaction region is tapered along its longitudinal axis.

10. The filter of claim 1, wherein said acousto-optic interaction region is less than 20 cm in length.

11. The filter of claim 1, wherein the acoustic wave generator produces multiple acoustic signals with individual controllable strengths and frequencies to select bands of lightwaves to be coupled from the cladding to the core.

12. The filter of claim 2, wherein said acoustic absorber has a lower acoustic impedance than the cladding of said optical fiber.

* * * * *